United States Patent
Jung et al.

(10) Patent No.: US 6,479,569 B2
(45) Date of Patent: Nov. 12, 2002

(54) SAFER PIGMENT PREPARATIONS

(75) Inventors: Rüdiger Jung, Kelkheim (DE); Klaus Saitmacher, Kriftel (DE); Arpad Acs, Oberursel (DE)

(73) Assignee: Clariant GmbH, Frankfurt (DE)

( * ) Notice: Subject to any disclaimer, the term of this patent is extended or adjusted under 35 U.S.C. 154(b) by 5 days.

(21) Appl. No.: 09/733,203

(22) Filed: Dec. 8, 2000

(65) Prior Publication Data

US 2001/0007887 A1 Jul. 12, 2001

(30) Foreign Application Priority Data

Dec. 9, 1999 (DE) .......................... 199 59 288

(51) Int. Cl.[7] .......................... C08K 3/32; C08K 5/51; C08K 5/58
(52) U.S. Cl. .......................... 523/205; 524/415; 524/147; 524/181; 252/601; 106/493; 106/496; 106/499
(58) Field of Search .................................. 106/493, 496, 106/499; 523/205; 524/415, 147, 131; 252/601

(56) References Cited

U.S. PATENT DOCUMENTS

| | | | |
|---|---|---|---|
| 3,423,343 A | 1/1969 | Barnett | |
| 3,978,195 A | 8/1976 | Schrodter et al. | |
| 4,347,334 A | 8/1982 | Staendeke et al. | |
| 4,396,586 A | 8/1983 | Maurer et al. | |
| 4,432,796 A | 2/1984 | Santimauro | |
| 4,467,056 A | 8/1984 | Staendeke et al. | |
| 4,511,546 A | 4/1985 | Schrodter et al. | |
| 4,515,632 A | 5/1985 | Maurer et al. | |
| 4,655,845 A | 4/1987 | Santimauro | |
| 4,702,861 A | 10/1987 | Farnum | |
| 5,043,151 A | 8/1991 | Staffel et al. | |
| 5,277,887 A | 1/1994 | Staffel et al. | |
| 6,162,375 A | * 12/2000 | Crouch et al. | ............. 252/603 |

FOREIGN PATENT DOCUMENTS

| | | |
|---|---|---|
| DE | 12 83 532 | 11/1968 |
| DE | 30 05 252 | 8/1981 |
| DE | 250 322 | 10/1987 |
| EP | 0 033 361 | 8/1981 |
| EP | 00 75 182 | 3/1982 |
| EP | 0 049 763 | 4/1982 |
| EP | 0 088 265 | 9/1983 |
| EP | 0 106 248 | 4/1984 |
| EP | 0 178 529 | 4/1986 |
| EP | 0 178 554 | 4/1986 |
| EP | 0 180 790 | 5/1986 |
| EP | 0 411 381 | 2/1991 |
| EP | 0 480 180 | 4/1992 |
| EP | 0 537 475 | 4/1993 |

OTHER PUBLICATIONS

PCT Search Report.
Derwent Patent Family Abstract for DD 250 322.
Derwent Patent Family Abstract for EP 0 180 790.
Derwent Patent Family Abstract for EP 0 178 554.
Derwent Patent Family Abstract for EP 0 178 529.
Derwent Patent Family Abstract for EP 0 480 180.

* cited by examiner

Primary Examiner—Kriellion A. Sanders
(74) Attorney, Agent, or Firm—Susan S. Jackson; Scott E. Hanf

(57) ABSTRACT

The invention relates to a pigment preparation comprising an organic pigment and 0.2 to 20% by weight, based on the total weight of the pigment preparation, of an ammonium polyphosphate or of an organophosphorus compound.

11 Claims, No Drawings

SAFER PIGMENT PREPARATIONS

BACKGROUND OF THE INVENTION

The present invention relates to low flammability, hot storable and nondeflagrating powder pigment preparations.

FIELD OF THE INVENTION

Many commercially available powder pigments have a burning time of less than 45 seconds for 100 mm, requiring them to be classified as a dangerous goods under current statutory guidelines. The handling and storing of such substances is therefore subject to special safety regulations, which usually necessitate very costly equipment and building measures.

DD 250 322 A1 discloses plastic molding compositions containing flame retardant pigments where the pigment is a crystalline nitridophosphate said to possess flame retardant properties. Ammonium polyphosphate (APP) is used for flameproofing plastics (DE-A1-30 05 252, EP-A-0 049 763), but it has a significant effect on the material properties of the surrounding medium.

There is hitherto no known method for improving the safety of organic powder pigments without impairing the material properties.

SUMMARY OF THE INVENTION

The present invention therefore has for its object to provide flameproofed or low flammability organic powder pigments without significant impairment of the pigmentary properties, the color properties, the rheology or the dispersibility.

It has been determined that this object is surprisingly achieved by a pigment preparation consisting essentially of the organic pigment and an ammonium polyphosphate or an organophosphorus compound.

DESCRIPTION OF THE PREFERRED EMBODIMENTS

The present invention accordingly provides a pigment preparation comprising an organic pigment and 0.2 to 20% by weight, preferably 1 to 15% by weight, especially 2 to 10% by weight, based on the total weight of the pigment preparation, of an ammonium polyphosphate (APP) or of an organophosphorus compound.

APPs for the purposes of the present invention include those of the general formula

$$H_{(n-m)+2}(NH_4)_m P_n O_{3n+1}$$

where n is an integer having an average of about 20 to 800 and the ratio of m to n is between 0.7 and 1.1 (DE-A-12 83 532); also microencapsulated APP, preferably comprising 75 to 99% by weight of APP of the above formula and preferably 1 to 25% by weight of a synthetic resin surrounding the individual APP particles, which synthetic resin may be composed of melamine and formaldehyde (EP-A-0 033 361); or of phenol and formaldehyde (DE-A-30 05 252); or of melamine and/or dicyandiamide (EP-A-0 106 248); of polyurea (EP-A-0 180 790), of polyurethane (EP-A-0 178 554) or of polycarbodiimide (EP-A-0 178 529).

APP itself can be prepared according to known processes, for example as described in U.S. Pat. No. 3 978 195, EP-A-0 480 180, EP-A-0 537 475, EP-A-0 411 381 or EP-A-0 088 265.

The above-described APPs are also commercially available under the name of ®Exolit (Clariant GmbH), eg. Exolit AP 422, Exolit AP 423, Exolit AP 452, Exolit AP 462.

Organophosphorus compounds for the purposes of the present invention are for example tris(2-chloroethyl) phosphate, tris(2-isopropyl) phosphate, (5-ethyl-2-methyl-1,3,2-dioxaphosphorinan-5-yl)methyl methyl methanephosphonate, phosphoric acid ethylene glycol polyester with hydroxyalkyl ester and alkyl ester groups or with hydroxyalkyl ester and chloroalkyl ester groups, eg. Exolit OP 514, Exolit OP 550, Exolit OP 910.

Useful organic pigments include for example azo pigments, such as monoazo, disazo, naphtol, azo condensation or metal complex pigments, and also polycyclic pigments, such as isoindolinone and isoindoline pigments, anthanthrone, thioindigo, quinophthalone, anthraquinone, dioxazine, phthalocyanine, quinacridone, perylene, perinone, diketopyrrolopyrrole, thiazoindigo and azomethine pigments.

Of particular interest are those organic pigments whose powders are readily combustible, for example C.I. Pigment Red 38, P. Red 184, P. Yellow 12, P. Orange 5.

The pigment preparation of the invention may further comprise customary assistants and additives, eg. dispersants, extenders, waxes, fillers, standardizers, defoamers, antidusters, shading colorants, surfactants, preservatives and drying retarders.

Of particular interest are pigment preparations consisting essentially of 0.2 to 20% by weight, preferably 1 to 15% by weight, especially 2 to 10% by weight, of an ammonium polyphosphate or of an organophosphorus compound; 99.8 to 80% by weight, preferably 99 to 85% by weight, especially 98 to 90% by weight, of an organic pigment; and 0 to 15% by weight, for example 0.1 to 10% by weight, of said assistants and additives; based on the total weight (100%) of the pigment preparation.

The pigment preparation of the invention can be prepared by mixing the organic pigment in the form of the pulverulent pigment or of a water-moist filter or press cake or of a pigment suspension with the APP or the organophosphorus compound in powder form or in the form of a solution or suspension in water, in the abovementioned mixing ratios, for example with the aid of a powder mixer or paste mixer.

The pigment preparations of the invention can be present in granular, microgranular or pulverulent form.

By adding APP, the invention changes the burning characteristics of readily combustible pigment powders to the effect that the flame self-extinguishes shortly after being lit. There is thus no reason to classify them as dangerous goods. By adding APP, the invention changes the dust explosion capability to the effect that the pressure rise rate ($K_{ST}$ value) is greatly reduced and the minimum ignition energies of practically relevant dust-air mixtures are higher by 1 to 2 orders of magnitude.

The pigment preparations prepared according to the invention are useful for pigmenting macromolecular organic materials of natural or synthetic origin, for example plastics, resins, varnishes, paints or electrophotographic toners and developers and also inks, including printing inks.

Macromolecular organic materials pigmentable using the pigment preparations mentioned include for example cellulose ethers and esters, such as ethylcellulose, nitrocellulose, cellulose acetate or cellulose butyrate, natural resins or synthetic resins, such as addition polymerization resins or condensation resins, for example amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or mixtures.

It is immaterial in this connection whether the macromolecular organic compounds mentioned are present as plastically deformable compositions, melts or in the form of dopes, coatings, paints or printing inks. Depending on the application, it is advantageous to use the pigment preparations of the invention as a blend or in the form of preparations or dispersions. Based on the macromolecular organic material to be pigmented, the pigment preparations of the invention are used in an amount of preferably 0.05 to 30% by weight, preferably 0.1 to 10% by weight.

The pigment preparations of the invention are also useful as colorants in electrophotographic toners and developers, for example one- or two-component powder toners (also known as one- or two-component developers), magnetic toners, liquid toners, addition polymerization toners and also specialty toners (L. B. Schein, "Electrophotography and Development Physics"; Springer Series in Electrophysics 14, Springer Verlag, 2nd edition, 1992).

Typical toner binders are addition polymerization, polyaddition and polycondensation resins, such as styrene, styrene-acrylate, styrene-butadiene, acrylate, polyester, phenol-epoxide resins, polysulfones, polyurethanes, individually or in combination, and also polyethylene and polypropylene, which may each include further ingredients, such as charge control agents, waxes or flow assistants, or are subsequently modified with these additives.

The pigment preparations of the invention are further useful as colorants in powders and powder coatings, especially in triboelectrically or electrokinetically sprayable powder coatings used for surface coating of objects composed for example of metal, wood, plastic, glass, ceramic, concrete, textile material, paper or rubber (J. F. Hughes, "Electrostatics Powder Coating" Research Studies, John Wiley & Sons, 1984).

Powder coating resins used are typically epoxy resins, carboxyl- and hydroxyl-containing polyester resins, polyurethane and acrylic resins together with customary hardeners. Combinations of resins are also used. For instance, epoxy resins combined with carboxyl- and hydroxyl-containing polyester resins are frequently used. Typical hardener components (depending on the resin system) include for example acid anhydride, imidazoles and also dicyandiamide and derivatives thereof, capped isocyanates, bisacylurethanes, phenolic and melamine resins, triglycidyl isocyanurates, oxazolines and dicarboxylic acids.

The pigment preparations of the invention are also useful as colorants in ink-jet inks based on aqueous and nonaqueous systems and also in inks processed by the hot-melt method.

The pigment preparations of the invention are further useful as colorants for color filters and also for additive as well as subtractive color production.

EXAMPLES

In the examples hereinbelow, parts and percentages are by weight.

Example 1

100 parts of pulverulent C.I. Pigment Red 38 are intensively mixed with 2 parts, 5 parts or 10 parts of Exolit AP 423 in a powder mixer to form a homogeneous dispersion.

Example 2

280 parts of aqueous pigment press cake (solids content 28% of C.I. Pigment Red 38 are intensively mixed with 2 parts, 5 parts or 10 parts of Exolit AP 423 in a paste mixer and subsequently dried.

Example 3

To prepare 100 parts of C.I. Pigment Red 38, the as-coupled suspension is cooled and admixed with 2 parts, 5 parts or 10 parts of Exolit AP 462. The low solubility of this Exolit preparation (microencapsulated ammonium polyphosphate) allows the pigment to be worked up by filtration and subsequent drying.

Example 4

100 parts of pulverulent C.I. Pigment Red 38 are uniformly sprayed with 2 parts, 5 parts or 10 parts of Exolit OP 910 in a horizontal mixer and subsequently dried. Exolit OP 910 is a viscous liquid which can be diluted with water to improve handleability.

Burning Tests

The test as per the UN recommendations on the transport of dangerous goods provides for the burning rate to be measured over a distance of 100 mm, the substance being heaped up in a predetermined triangular mold on a ceramic plate. Six individual measurements were carried out, and the highest burning rate was evaluated. The measured values are reported, in the table hereinbelow as averages over the measuring distance of 100 mm.

| Sample | 100 mm burning time in seconds |
|---|---|
| Comparison (without APP): | |
| P.R. 38 (particle size ~ 4.3 μm ($d_{50}$) | 28 |
| P.R. 38 (particle size ~ 11.1 μm ($d_{50}$) | 43 |
| According to invention (with APP): | |
| Example 1, 10% AP 423 | Flame extinguishes over measuring distance |
| Example 1, 5% AP 423 | Flame extinguishes over measuring distance |
| Exampie 1, 2% AP 423 | 54 |
| Example 2, 10% AP 423 | Flame extinguishes over measuring distance |
| Example 2, 5% AP 423 | Flame extinguishes over measuring distance |
| Example 2, 2% AP 423 | 57 |
| Example 3, 10% AP 462 | Flame extinguishes over measuring distance |
| Example 3, 5% AP 462 | Flame extinguishes over measuring distance |
| Example 3, 2% AP 462 | 58 |
| Example 4, 10% OP 910 | Flame extinguishes over measuring distance |
| Example 4, 5% OP 910 | Flame extinguishes over measuring distance |
| Example 4, 2% OP 910 | Flame extinguishes over measuring distance |

None of the mixtures tested still classifies as an "readily combustible solid". A flame-inhibiting effect was observed even at the lowest concentration.

In contrast to untreated pigment powders, the particle size distribution has no effect on burning in the case of pigment preparations according to the invention.

Examples 5 to 8

The following pigments were processed into pigment preparations in the same way as in Examples 1 to 4:
5) C.I. Pigment Red 184,
6) C.I. Pigment Orange 5,
7) C.I. Pigment Yellow 74,
8) C.I. Pigment Yellow 12

Hot storage in 1l wire basket according to UN manual of tests and criteria (test method N.4):

Heat aging C.I. Pigment Yellow 12 in the 1l wire basket with a 0%, 5% and 10% fraction of Exolit ASP 423 at an oven temperature of 120° C. caused the self-heating to decrease from 33° C. (0% ASP 423) to 18° C. (5% ASP 423) or 11° C. (10% ASP 423).

Testing of Dust Explosion Characteristics

Dust explosion characteristics were determined in a sealed 20 l sphere using a chemical primer (ignition energy 10 000 mJ) and an impact nozzle as dust disbursing system.

The minimum ignition energies were determined in a MIKE III apparatus modified Hartmann tube) using a mushroom type dust disbursing system, an HV relay and moving electrode as trigger, a charging voltage of 11 or 15 kV and an electrode distance of 6 mm.

Example 9

A pigment preparation as per Example 7 (C.I. Pigment Yellow 74 with a 10% fraction of Exolit AP 423) is tested with regard to its dust explosion characteristics. A $K_{ST}$ value of 250 bar*m/s is found. The minimum ignition energies are 300 mJ (dust concentration 1 mg/l). A C.I. Pigment Yellow 74 without added Exolit AP 423 has a $K_{ST}$ value of 320 bar*m/s and a minimum ignition energy of 3 mJ, in each case at dust concentrations of 0.5 to 1.5 mg/l.

What is claimed is:

1. A pigment preparation comprising an organic pigment and 0.2 to 20% by weight, based on the total weight of the pigment preparation, of an ammonium polyphosphate or of an organophosphorus compound, wherein the organic pigment is an azo pigment or a polycyclic pigment.

2. A pigment preparation as claimed in claim 1, including 1 to 15% by weight, based on the total weight of the pigment preparation, of an ammonium polyphosphate or of an organophosphorus compound.

3. A pigment preparation as claimed in claim 1, wherein the ammonium polyphosphate has the formula $$H_{(n-m)+2}(NH_4)_m P_n O_{3n+1}$$

where n is an integer having an average value of about 20 to 800 and the ratio of m to n is between 0.7 and 1.1.

4. A pigment preparation as claimed in claim 3, wherein the ammonium polyphosphate is microencapsulated by a synthetic resin selected from the group consisting of melamine-formaldehyde, phenol-formaldehyde, melamine, dicyandiamide, polyurea, polyurethane and polycarbodiimide.

5. A pigment preparation as claimed in claim 1, wherein the organophosphorus compound is a tris(2-chloroethyl) phosphate, tris(2-isopropyl)phosphate, (5-ethyl-2-methyl-1,3,2-dioxaphosphorinan-5-yl) methyl methyl methanephosphonate, phosphoric acid ethylene glycol polyester with hydroxyalkyl ester and alkyl ester groups, or with hydroxyalkyl ester and chloroalkyl ester groups.

6. A pigment preparation as claimed in claim 1, wherein the azo pigment is a monoazo, disazo, naphtol, metal complex or azo condensation pigment.

7. A pigment preparation as claimed in claim 1, wherein the polycyclic pigment is an isoindolinone, isoindoline, anthanthrone, thioindigo, quinophthalone, anthraquinone, dioxazine, phthalocyanine, quinacridone, perylene, perinone, diketopyrrolopyrrole, thiazoindigo or azomethine pigment.

8. A pigment preparation as claimed in claim 1, consisting essentially of 0.2 to 20% by weight of an ammonium polyphosphate or of an organophosphorus compound; 99.8 to 80% by weight of an organic pigment; and 0 to 15% by weight of an assistant or additive; based on the total weight (100%) of the pigment preparation.

9. A process for preparing a pigment preparation as claimed in claim 1, which comprises mixing an organic pigment in the form of a pulverulent pigment or of a water-moist filter or press cake or of a pigment suspension with an ammonium polyphosphate or an organophosphorus compound in powder form or in the form of a solution or suspension in water.

10. A method of pigmenting macromolecular organic material of natural or synthetic origin comprising the step of adding a pigment preparation as claimed in claim 1 to said macromolecular material to be pigmented.

11. The method as claimed in claim 10, wherein the macromolecular organic material is a plastic, resin, varnish, paint, electrophotographic toner or developer, an ink or a powder coating.

* * * * *